United States Patent
Laubry et al.

(10) Patent No.: US 7,319,126 B2
(45) Date of Patent: Jan. 15, 2008

(54) SYNTHETIC BRANCHED POLYISOPRENES AND PROCESS FOR OBTAINING THEM

(75) Inventors: Philppe Laubry, Greer, SC (US); Fanny Barbotin, Clermont-Ferrand (FR); Philippe Johnson, Perignat-sur-Allier (FR); Jean-Luc Auger, Clermont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 11/108,083

(22) Filed: Apr. 18, 2005

(65) Prior Publication Data

US 2005/0261453 A1  Nov. 24, 2005

Related U.S. Application Data

(63) Continuation of application No. PCT/EP2003/011302, filed on Oct. 13, 2003.

(30) Foreign Application Priority Data

Oct. 21, 2002  (FR)  .................................. 02 13132

(51) Int. Cl.
*C08F 12/34*  (2006.01)
(52) U.S. Cl. ...................... 526/335; 526/337; 524/127; 524/140
(58) Field of Classification Search ................ 526/335, 526/337; 524/127, 140, 141
See application file for complete search history.

(56) References Cited

U.S. PATENT DOCUMENTS 3,413,253 A * 11/1968 Kilbourne ..................... 524/87
3,454,546 A * 7/1969 Wilcoxen, Jr. .............. 526/181
5,064,910 A * 11/1991 Hattori et al. ........... 525/359.1

FOREIGN PATENT DOCUMENTS

EP  1 026 181 A1  8/2000
WO  WO 02/38635 A1  5/2002

* cited by examiner

*Primary Examiner*—Robert D. Harlan
(74) *Attorney, Agent, or Firm*—Buchanan Ingersoll & Rooney PC (57) ABSTRACT

Branched synthetic polyisoprenes are described having a macrostructure and a microstructure very similar to those of natural rubber. According to one aspect, these polyisoprenes have an apparent stress $F/S_0$ greater than or equal to 0.4 MPa at a relative elongation $\alpha$ of 150%, applied to a dumbbell-shaped test specimen consisting of the crosslinkable polyisoprene. According to another aspect, these polyisoprenes fulfill the relationship:

$$\text{Cotan } \delta \geq 0.3761 \cdot \eta_{inh} + 0.15, \qquad (i)$$

where cotan $\delta$ is the cotangent of the loss angle of a sample of said polyisoprene, measured at 130° C. by means of an instrument known by the trade name "RPA2000", said sample being subjected to shear stress to 10% deformation and at a stress frequency of 0.035 Hz, and where $\eta_{inh}$ is the inherent viscosity of said polyisoprene, measured in toluene at 25° C. and at a concentration of said polyisoprene in toluene of 0.1 g/dl.

24 Claims, 3 Drawing Sheets

SYNTHETIC BRANCHED POLYISOPRENES AND PROCESS FOR OBTAINING THEM

CROSS-REFERENCE TO RELATED APPLICATIONS

The present application is a continuation of PCT Application No. PCT/EP2003/011302, filed Oct. 13, 2003, published in French on Apr. 29, 2004, as WO 2004/035638, which claims priority of French Application No. 02/13132, filed Oct. 21, 2002, the entire contents of both applications being incorporated herein in their entirety.

BACKGROUND OF THE INVENTION

1. Field of the Invention

The present invention relates to synthetic branched polyisoprenes having macrostructural and microstructural characteristics very similar to those of natural rubber, and to a synthesis process for these polyisoprenes. These synthetic polyisoprenes may advantageously be used in rubber compositions for tires as a replacement for natural rubber.

2. Description of Related Art

Natural rubber (also referred to as "natural polyisoprene") is still widely used in rubber compositions for tires, despite the advances made in recent years in obtaining synthetic polyisoprenes capable of partially replacing natural rubber in certain locations in tires.

Since natural rubber is in particular characterised in the pure state by a cis-1,4 linkage content of 100%, attempts have been made to synthesise polyisoprenes which have a value for said content which is as close as possible to 100%.

The most significant advance in this area is described in International Patent Specification WO-A-02/38635 in the name of the applicants, which proposes a catalytic system of the "preformed" type based on at least:

a conjugated diene monomer, an organic phosphoric acid salt of one or more rare earth metals (metals with an atomic number between 57 and 71 in Mendeleev's periodic table of elements), said salt being in suspension in at least one inert, saturated and aliphatic or alicyclic hydrocarbon solvent, an alkylating agent consisting of an alkylaluminum of formula $AlR_3$ or $HAlR_2$, the (alkylating agent:rare earth salt) molar ratio ranging from 1 to 5, and a halogen donor consisting of an alkylaluminum halide.

This catalytic system makes it possible to polymerise isoprene with satisfactory activity at polymerization temperatures which are less than or equal to 5° C., and to obtain polyisoprenes at these low temperatures which have cis-1,4 linkage contents, measured both by the carbon 13 nuclear magnetic resonance method and by mid-infrared analysis, which are strictly greater than 99.0%.

Natural rubber is also characterised in that, when uncrosslinked (i.e. in the "uncured" state before any curing has been carried out), it exhibits a force-elongation curve which is very much "straightened out" relative to those of hitherto known synthetic polyisoprenes (i.e. the respective gradients of the tangents to this curve at given relative elongations are much steeper for natural rubber, for example at relative elongations of 300% and 400%), which means that, when tension is applied thereto, natural rubber crystallises much more in the uncrosslinked state than do synthetic polyisoprenes.

This inadequate crystallisation under tension exhibited by synthetic polyisoprenes in particular means that the mechanical properties of rubber compositions incorporating them sometimes degenerate greatly during processing, which makes these compositions unsuitable for replacing those based on natural rubber at all tire production stations.

Natural rubber also differs from hitherto known synthetic polyisoprenes with regard to its degree of branching in the uncrosslinked state, said degree being very high in the case of natural rubber, but relatively low in the case of synthetic polyisoprenes.

One major drawback of hitherto known synthetic polyisoprenes is therefore that, in the uncrosslinked state, they do not exhibit the above-stated characteristics of crystallisation under tension and of branching which in particular characterise natural rubber.

SUMMARY OF THE INVENTION

The object of the present invention is to overcome this drawback and said object is achieved, as the applicants have surprisingly discovered, in that, if isoprene is homopolymerised in an inert hydrocarbon polymerization solvent or without solvent by means of a "preformed" catalytic system based at least:

a conjugated diene monomer, an organic phosphoric acid salt of one or more rare earth metals, said salt being in suspension in at least one inert, saturated and aliphatic or alicyclic hydrocarbon solvent which is included in said catalytic system, an alkylating agent consisting of an alkylaluminum of the formula $AlR_3$ or $HAlR_2$, H being hydrogen and R being an alkyl group, and a halogen donor consisting of an alkylaluminum halide, and if, after said homopolymerization, said catalytic system is caused to react by a cationic mechanism with at least one branching agent which may or may not comprise an organic Lewis acid, a branched polyisoprene is obtained which has a high cis-1,4 linkage content, is practically gel-free and exhibits an apparent stress $F/S_0$ of greater than or equal to 0.4 MPa at a relative elongation α of 150%, applied to a dumbbell-shaped test specimen made from crosslinkable (i.e. "uncured") polyisoprene and which is successively obtained by:

forming a plate of thickness E=2.5 mm consisting of said polyisoprene by pressure moulding for 10 minutes at 110° C. in a mould between two polyester sheets, cooling the plate formed in said manner under pressure for a period of 16 hours, extracting the plate formed and cooled in said manner from said mould on completion of said period, cutting out said test specimen from the plate extracted in said manner such that said test specimen comprises two ends joined to one another by a shank of thickness E=2.5 mm, length L=26 mm and width W=6 mm, this test specimen then being subjected, at the latest 1 hour after said extraction, to tension at a temperature of 23° C. and atmospheric humidity of 50% by displacement at the constant speed of 100 mm/min of the mobile jaws of a tensile tester known by the trade name "INSTRON 4501" relative to the fixed jaws of said tester, said jaws respectively holding said ends with an identical clamping pressure of 2 bar, where:

α(%)=100×D/L (D being the measured displacement of said mobile jaws in mm), and $F/S_0$ (MPa)=tensile force F/initial cross-section $S_0$ (W.E in $mm^2$) of the test specimen.

Reference will be made to the attached appendix 1, paragraph I/, for the exact conditions for obtaining this apparent stress as a function of deformation.

BRIEF DESCRIPTION OF THE DRAWING FIGURES

FIG. 1 is a graph showing the apparent stress $F/S_0$ (MPa) vs. deformation (%) curves of uncrosslinked test specimens obtained according to the method described in the attached appendix 1, paragraph I/, which respectively consist of:

synthetic branched polyisoprenes according to the invention, linear synthetic polyisoprenes not in accordance with the invention, commercially available polyisoprenes, and natural rubbers which are commercially available;

FIG. 2 is a graph showing the apparent stress $F/S_0$ (MPa) vs. deformation (%) curves of test specimens obtained according to the method described in the attached appendix 1, paragraph II/, and which respectively consist of uncrosslinked, carbon black-filled rubber compositions, and respectively comprise:

synthetic branched polyisoprenes according to the invention, and a commercially available natural rubber;

FIG. 3 is a graph illustrating, for given inherent viscosity values (in dl/g), the respective cotangent values of the loss angle (cotan δ) corresponding to:

synthetic branched polyisoprenes according to the invention, a linear synthetic polyisoprene which is not in accordance with the invention, and commercially available polyisoprenes;

DETAILED DESCRIPTION OF THE INVENTION

It will be noted that the branched polyisoprenes according to the invention obtained in said manner have a force-elongation curve in the uncrosslinked state which is characterised by an apparent stress value $F/S_0$ which is very much higher than that of known synthetic polyisoprenes for given elongations and which is relatively close to the force-elongation curves in the uncrosslinked state of known natural rubbers.

This "straightening out" of the force-elongation curve in the uncrosslinked state reveals an increased ability, relative to known synthetic polyisoprenes, of the polyisoprenes according to the invention to crystallise under tension.

Advantageously, said apparent stress $F/S_0$ of the polyisoprenes according to the invention is greater than or equal to 0.5 MPa for said relative elongation α of 150% and, even more advantageously, it is greater than or equal to 0.6 MPa for this same relative elongation.

It will be noted that these latter apparent stress values at 150% relative elongation impart force-elongation curves in the uncrosslinked state to the synthetic polyisoprenes according to the invention which are extremely close to the force-elongation curves in the uncrosslinked state of known natural rubbers. As a result, these polyisoprenes crystallise under tension in practically the same manner as natural rubber.

Preferably, these branched synthetic polyisoprenes according to the invention are obtained by performing said homopolymerization at a temperature of between −55° C. and 55° C.

It is likewise preferred for this homopolymerization to use a (polymerization solvent:isoprene monomer) ratio which is between 5 and 20.

Said branching agent preferably belongs to the group consisting of halogenated metal compounds and halogenated organometallic compounds.

According to a preferred example of embodiment of the invention, said branching agent is a halogenated metal compound of formula $MX_m$, M being a metal of group IV or V, X a halogen represented by fluorine, chlorine, bromine or iodine and m an integer equal to 3 or 4.

Even more preferably for this preferred example, said branching agent is titanium tetrachloride, tin tetrachloride or phosphorus trichloride.

According to another preferred example of embodiment of the invention, said branching agent is a halogenated organometallic compound of formula $R_nM'X_{4-n}$, R being an aliphatic, alicyclic or aromatic hydrocarbon group, M' a metal of group IV or V, X a halogen represented by fluorine, chlorine, bromine or iodine and n an integer of from 1 to 3.

It will be noted that the branching agent according to the invention may be used, following the polymerization, in a (branching agent:neodymium salt) mass ratio of, for example, from 2 to 20.

According to one variant embodiment of the invention, the synthetic polyisoprenes according to the invention are obtained, following said homopolymerization and prior to the addition of said branching agent, by the addition of a supplementary quantity of said catalytic system.

In accordance with this variant embodiment, it is, for example, possible to vary the quantity of rare earth metal from 200 μmol to 600 μmol per 100 g of isoprene monomer in order to perform the homopolymerization and then, when making the supplementary addition of catalytic system, to vary the quantity of rare earth metal added from 500 μmol to 100 μmol per 100 g of said monomer.

In the event that the entirety of the catalytic system is introduced for the purposes of the homopolymerization, it is, for example, possible to vary the quantity of rare earth metal from 500 μmol to 2500 μmol per 100 g of said monomer.

According to another aspect of the present invention, the applicant has furthermore surprisingly discovered that if said isoprene homopolymerization is performed by means of said catalytic system in said polymerization solvent or without solvent and if, following this polymerization, the polymerization medium is reacted with said branching agent, a polyisoprene is obtained which has a high cis-1,4 linkage content and is very branched, following the example of natural rubber, since it fulfils the following relationship:

$$\text{Cotan } \delta \geq 0.3761 \cdot \eta_{inh} + 0.15, \qquad (i)$$

where cotan δ is the cotangent of the loss angle of a sample of said polyisoprene, measured at 130° C. by means of an instrument known by the trade name "RPA2000", said sample being subjected to shear stress to 10% deformation and at a stress frequency of 0.035 Hz (see appendix 2 of the present description), and where $\eta_{inh}$ is the inherent viscosity of said polyisoprene, measured in toluene at 25° C. and at a concentration of said polyisoprene in toluene of 0.1 g/dl (see appendix 3 of the present description).

The relationship (i), established on the basis of the variation in the moduli G' and G" as a function of the applied frequency, takes account of the dynamic shear properties of the polyisoprene according to the invention, cotan δ representing the ratio of the moduli G'/G", where G' is the true modulus, also referred to as the elastic or in-phase modulus, and where G" is the imaginary modulus, also referred to as the loss modulus or in-quadrature modulus (cotan δ represents a viscoelasticity index of the polyisoprene).

It will be noted that this relation (i) makes it possible to associate the rheological properties of the polyisoprene with its macrostructure and in particular with its degree of branching, which, for a given inherent viscosity, is assessed by the value of cotan δ. In fact, for a given inherent viscosity $\eta_{inh}$, it is known that the higher is an elastomer's cotan δ value, the more it is branched.

As it has been possible to verify, for a given inherent viscosity, the synthetic polyisoprenes according to the invention are characterised by a cotan δ value which is very much higher than that of known synthetic polyisoprenes, as a result of which the polyisoprenes according to the invention are substantially more branched than known synthetic polyisoprenes.

The branched polyisoprenes according to the invention fulfil the relationship:

$$\text{Cotan } \delta \geq 0.3761 \cdot \eta_{inh} + 0.60. \quad \text{(ii)}$$

Still more advantageously, these branched polyisoprenes fulfil the relationship:

$$\text{Cotan } \delta \geq 0.3761 \cdot \eta_{inh} + 1.0. \quad \text{(iii)}$$

Advantageously, the polyisoprenes according to the invention have an inherent viscosity $\eta_{inh}$, measured at 0.1 g/dl in toluene according to the attached appendix 3, which is greater than or equal to 4 dl/g and, still more advantageously, is greater than or equal to 4.5 dl/g, following the example of commercially available synthetic polyisoprenes exhibiting the highest inherent viscosities.

According to a particularly advantageous embodiment of the invention, an (alkylating agent:rare earth salt) molar ratio is used in the catalytic system which has a value of from 1 to 7, and still more advantageously from 1 to 5, such that the polyisoprene obtained according to the invention has a cis-1,4 linkage content, measured by the mid-infrared analysis method (see appendix 4 for the description of this method) which is greater than or equal to 98.0% and, advantageously, is strictly greater than 98.5%.

According to a preferred example of this embodiment of the invention, said isoprene polymerization reaction is performed at a temperature of below 0° C., such that said polyisoprene has a cis-1,4 linkage content, measured according to the mid-infrared analysis method, which is strictly greater than 99.0%.

According to a still more preferred example of this embodiment of the invention, said isoprene polymerization reaction is performed at a temperature of less than or equal to −10° C., such that said polyisoprene has a cis-1,4 linkage content, measured by the mid-infrared analysis method, which is greater than or equal to 99.3%.

It will be noted that these values for the cis-1,4 linkage content are very close to the value of 100% which characterises natural rubber. The range of cis-1,4 linkage contents measured according to the present invention takes account of measurements made by means of the mid-infrared analysis method after calibration of the polyisoprene samples by $^{13}$C NMR analysis (within the measurement uncertainty of plus or minus 0.1% which is inherent to said method). The precision of these values for cis-1,4 linkage content is thus substantially increased relative to the precision of such contents which have hitherto been mentioned in the prior art.

It will furthermore be noted the very high content of cis-1,4 linkages obtained for the polyisoprenes according to the invention is independent of the quantity of catalytic system used.

1,3-Butadiene may be mentioned as a preferred conjugated diene monomer usable for "preforming" the catalytic system of the invention.

Other conjugated dienes which may be mentioned are 2-methyl-1,3-butadiene (or isoprene), 2,3-di(C1 to C5 alkyl)-1,3-butadienes such as, for instance, 2,3-dimethyl-1, 3-butadiene, 2,3-diethyl-1,3-butadiene, 2-methyl-3-ethyl-1, 3-butadiene, 2-methyl-3-isopropyl-1,3-butadiene, phenyl-1, 3-butadiene, 1,3-pentadiene, 2,4-hexadiene or any other conjugated diene having between 4 and 8 carbon atoms.

It will be noted that, in said catalytic system, the (conjugated diene monomer:rare earth salt) molar ratio may have a value of from 15 to 70 and, preferably, of from 25 to 50.

According to another characteristic of the invention, said rare earth salt consists of a non-hygroscopic powder having a slight tendency to agglomerate at ambient temperature.

According to a preferred embodiment of the invention, the inert hydrocarbon solvent in which said rare earth salt is suspended is a low molecular weight aliphatic or alicyclic solvent, such as cyclohexane, methylcyclohexane, n-heptane or a mixture of these solvents.

According to another embodiment of the invention, the solvent used to suspend the rare earth salt is a mixture of a high molecular weight aliphatic solvent comprising a paraffinic oil, for example petrolatum oil, and a low molecular weight solvent, such as those mentioned above (for example methylcyclohexane).

This suspension is prepared by dispersive grinding of the rare earth salt in this paraffinic oil in such a manner as to obtain a very fine and homogeneous suspension of the salt.

According to another characteristic of the invention, said catalytic system comprises said rare earth metal or metals in a concentration of from 0.01 mol/l to 0.06 mol/l, preferably of from 0.015 mol/l to 0.025 mol/l.

According to a preferred example of embodiment of the invention, the salt used in said catalytic system is a tris[bis (2-ethylhexyl)phosphate] salt of the rare earth metal or metals.

Even more preferably, said rare earth salt is neodymium tris[bis(2-ethylhexyl)phosphate].

Alkylating agents usable in the catalytic system of the invention which may be mentioned are alkylaluminum such as:

trialkylaluminums, for example triisobutylaluminum, or
dialkylaluminum hydrides, for example diisobutylaluminum hydride.

It will be noted that this alkylating agent preferably consists of diisobutylaluminum hydride (referred to as DiBAH in the remainder of the present description).

Halogen donors usable in the catalytic system of the invention which may be mentioned are alkylaluminum halides, preferably diethylaluminum chloride (referred to as DEAC in the remainder of the present description).

It will be noted that the (halogen donor:rare earth salt) molar ratio may have a value ranging from 2.0 to 3.5 and, preferably, from 2.6 to 3.0.

According to the invention, the process for the preparation of said catalytic system consists:

in a first step, of preparing a suspension of said salt in said solvent, in a second step, of adding said conjugated diene monomer to the suspension, in a third step, of adding said alkylating agent to the suspension comprising said monomer to obtain an alkylated salt, and in a fourth step, of adding said halogen donor to the alkylated salt.

The aforementioned characteristics of the present invention, as well as others, will be better understood on reading the following description of several examples of embodiment of the invention, which are given by way of non-limiting illustration, said description being made in conjunction with the attached drawings.

I. Preparation of Catalytic Systems of the Invention

1) Synthesis of an Organic Phosphate Salt of Neodymium According to the Invention:

A plurality of tests was carried out for synthesis of this salt. The same synthesis method, which is described in detail below, was used for each of these tests.

a) Synthesis of an Aqueous Solution of Neodymium $NdCl_3$, $6H_2O$:

A given quantity of $Nd_2O_3$ is introduced into a reactor. 31.25 kg of demineralised water are added per kg of $Nd_2O_3$. 1.56 l of concentrated, 36% by weight HCl (d=1.18) are added per kg of $Nd_2O_3$.

The reaction $Nd_2O_3 + 6\ HCl + 9\ H_2O \rightarrow 2\ NdCl_3, 6H_2O$ is highly exothermic.

Once all the hydrochloric acid has been added, the solution is raised to boiling while being stirred for 30 minutes to eliminate the excess hydrochloric acid. The aqueous $NdCl_3$ solution is clear and mauve in colour. No insoluble product ($Nd_2O_3$) remains.

The pH of the solution, measured at 25° C., is corrected by addition of 2 mol per litre sodium hydroxide solution. The final pH is approximately 4.5.

b) Synthesis of an Organic Sodium Phosphate of Formula $[RO]_2P(O)ONa$ (R=2-Ethylhexyl):

27.8 kg of demineralised water per kg of $Nd_2O_3$ from the synthesis of paragraph a) above are introduced into an empty reactor. 0.708 kg of NaOH flakes are dissolved per kg of $Nd_2O_3$ from said paragraph a). Again per kg of starting $Nd_2O_3$, 10.4 l of acetone and 5.819 kg of an organic phosphoric acid (bis(2-ethylhexyl)phosphoric acid, listed in the Aldrich catalogue under reference 23,782-5) are added to another reactor.

The solution of said organic phosphoric acid is poured into the NaOH solution at ambient temperature. The reaction is as follows:

The reaction is slightly exothermic and a homogeneous solution of a yellowish colour is obtained. The pH of the solution, measured at 25° C., is equal to 5.4.

c) Synthesis of a Phosphated Neodymium Salt of the Formula $[[RO]_2P(O)O]_3Nd$:

The aqueous solution of $NdCl_3$, $6H_2O$ obtained in paragraph a) above is poured with vigorous stirring and at a temperature of 36° C. into the solution of organic Na phosphate obtained in paragraph b) above. Addition may, if need be, be made in the reverse order. A very fine white precipitate forms immediately. The resultant mixture is stirred for a further 15 minutes once all the organic Na phosphate has been added:

The phosphated neodymium salt obtained in said manner is recovered by settling and is washed for 15 minutes with a mixture of 45 litres of demineralised water and 15 litres of acetone. The phosphated neodymium salt is then recovered by centrifugation.

The pH of the "mother liquors" is between 3 and 4 at 25° C. These "mother liquors" are colourless and clear. The qualitative analytic test for chlorides is virtually negative for the final washing water (the reaction is as follows: $NaCl + AgNO_3$ ($HNO_3$ medium)$\rightarrow AgCl\downarrow + NaNO_3$).

The neodymium salt washed in this manner is dried in an oven at 60° C. under a vacuum and with air-flow for 72 hours.

2) Synthesis of Seven "Preformed" Catalytic Systems According to the Invention:

a) Composition of These Seven Catalytic Systems:

Each of these systems comprises a phosphated neodymium salt as synthesised according to paragraph 1) above, said salt being in suspension in a low molecular weight inert hydrocarbon solvent (consisting of methylcyclohexane, hereinafter abbreviated to "MCH").

These catalytic systems are characterised by the following relative molar ratios, with respect to the neodymium salt:

Nd salt:butadiene (Bd):DiBAH:DEAC=1:30 or 50:1.8 or 3:2.6 or 3.

The final Nd concentration of these catalytic systems is 0.02 M.

b) Synthesis Process for each of these Seven Catalytic Systems:

First Step:

In order to obtain these catalytic systems, a given quantity of neodymium salt, in powder form, is poured into a reactor from which any impurities have previously been removed. This salt is then subjected to nitrogen bubbling from the bottom of the reactor for a period of 15 minutes.

Second Step:

Approximately 90% (mass fraction) of the solvent stated in paragraph 2)a) above is introduced into the reactor containing the neodymium salt, the neodymium salt being contacted with this solvent for 30 min. and the contacting temperature being 30° C.

Third Step:

Butadiene is then introduced into the reactor (in the salt:butadiene molar ratio of 1:50 or 1:30 stated in paragraph 2)a) above), at a temperature of 30° C., with the aim of "preforming" each catalytic system.

Fourth Step:

DiBAH is then introduced into the reactor as the alkylating agent for the neodymium salt, at a concentration of approximately 1 M in MCH. Alkylation time is 30 min. and the alkylation reaction temperature is 30° C.

Fifth Step:

DEAC is then introduced into the reactor as the halogen donor, in a concentration of approximately 1 M in MCH. The temperature of the reaction medium is adjusted to 60° C.

Sixth Step:

The resultant mixture is then "preformed" (or aged) by maintaining this temperature of 60° C. for a period of 2 hours.

Seventh Step:

A catalytic system solution is obtained in this manner. The reactor is emptied and the contents transferred into a 750 ml "Steinie" bottle, which has previously been washed, dried and subjected to nitrogen bubbling.

Finally, the catalytic solution is stored under a nitrogen atmosphere in a freezer at a temperature of −15° C.

Table 1 below contains the characteristics of each catalytic system 1 to 7 and the process for the preparation thereof.

TABLE 1

| Nd:Bd:<br>DiBAH:DEAC | System 1<br>1:30:1.8:2.6 | System 2<br>1:30:1.8:2.6 | System 3<br>1:30:1.8:2.6 | System 4<br>1:30:1.8:2.6 | System 5<br>1:50:3:3 | System 6<br>1:30:1.8:2.6 | System 7<br>1:50:3:3 |
|---|---|---|---|---|---|---|---|
| Solvation (solvent/duration/temperature) | MCH<br>30 min.<br>30° C. | MCH<br>30 min.<br>30° C. | MCH<br>30 min.<br>30° C. | MCH<br>30 min.<br>30° C. | MCH<br>30 min.<br>30° C. | MCH<br>30 min.<br>30° C. | MCH<br>30 min.<br>30° C. |
| Volume of MCH (liters) | 0.581 | 20.5 | 20.5 | 20.5 | 19 | 20.5 | 50 |
| Mass of Nd phosphate (g) | 15.6 | 550 | 550 | 550 | 550 | 550 | 1500 |
| Mass of butadiene (g) | 22.8 | 804 | 804 | 804 | 1340 | 804 | 3655 |
| Alkylation (duration, temperature) | 30 min.<br>30° C. | 30 min.<br>30° C. | 30 min.<br>30° C. | 30 min.<br>30° C. | 30 min.<br>30° C. | 30 min.<br>30° C. | 30 min.<br>30° C. |
| Volume of DiBAH (ml) | 29 | 1064 | 941 | 1007 | 1678 | 1061 | 5415 |
| DiBAH titre (mol/l) | 0.8793 | 0.84 | 0.95 | 0.89 | 0.89 | 0.84 | 0.75 |
| DEAC ageing (duration, temperature) | 2 hours<br>60° C. | 2 hours<br>60° C. | 2 hours<br>60° C. | 2 hours<br>60° C. | 2 hours<br>60° C. | 2 hours<br>60° C. | 2 hours<br>60° C. |
| Volume of DEAC (ml) | 40 | 1356 | 1343 | 1310 | 1512 | 1337 | 4615 |
| DEAC titre (mol/l) | 0.926 | 0.952 | 0.961 | 0.985 | 0.985 | 0.9653 | 0.88 |

II. Synthesis of Polyisoprenes Via These Catalytic Systems

1) Synthesis Process Used:

On the one hand, 16 branched polyisoprenes A to P according to the present invention were prepared by synthesis by means of catalytic systems and branching agents according to the invention, as were, on the other hand, three linear polyisoprenes Q, R, S not in accordance with the present invention by synthesis by means of a catalytic system according to the invention but without the addition of a branching agent.

A 250 ml "Steinie" bottle was used for the synthesis of branched polyisoprenes A, B, C, D, E, F, G, H, M, N, O, P and of the first linear polyisoprene Q. The second linear polyisoprene R was synthesised using a 750 ml "Steinie" bottle (the "Steinie" bottle is sealed by means of a "seal/open-top cap" assembly allowing the catalytic system to be injected by means of a syringe).

A 100 litre stirred reactor was used for the synthesis of branched polyisoprenes I, J, K, L and of the third linear polyisoprene T.

In relation to the polymerizations performed in the bottles, each polymerization reaction was performed dynamically with stirring in a water trough or in a glycol trough (for polymerization performed at a temperature of below 0° C.).

A steam-cracked C5 naphtha fraction was used with the aim of extracting isoprene therefrom with a purity approaching 100%. To this end, a conventional laboratory purification process was used comprising the following successive steps:

distillation of this C5 fraction over maleic anhydride to eliminate any residual cyclopentadiene, followed by passage through an alumina column to remove polar impurities, and nitrogen bubbling for 20 minutes, immediately prior to the polymerization reaction.

The mass fraction of isoprene extracted from this C5 fraction was determined at approaching 99% by gas phase chromatography (GPC).

For each test A to S which was performed, the isoprene polymerization reaction was carried out using 10 g or 50 g of isoprene respectively when performing polymerization in said 250 ml or 750 ml "Steinie" bottles or alternatively 8469 g of isoprene when performing polymerization in said 100 l stirred reactor.

When the polymerization temperature is greater than or equal to 0° C., cyclohexane is used as the polymerization solvent, while methylcyclohexane is used for a polymerization temperature of below 0° C. (only tests D and E).

Furthermore, the polymerization solvent:monomer (S:M) mass ratio under an inert nitrogen atmosphere is equal to 9, except for test R where this ratio is equal to 7 and for tests I, J, K, L where said ratio is between 10 and 20.

The quantity of neodymium catalytic base was varied in the various polymerization tests from 100 µmol to 1750 µmol per 100 g of monomer (quantity of neodymium hereinafter stated in µMcm).

In order to obtain each of the branched polyisoprenes in polymerization tests A to L, there is added to the "living" polymer, after 100% conversion, a branching agent according to the invention (consisting of titanium or tin tetrachloride) in a (branching agent:neodymium salt) mass ratio of between 2 and 15.

In order to obtain each of the branched polyisoprenes in polymerization tests M, N, O, P (see asterisk "*" in Table 2), there is added to the "living" polymer, after 100% conversion, a specific quantity (400 µMcm for each of tests M, N, O and 450 µMcm for test P) of the same catalytic system as previously used for the polymerization (in a quantity of 300 µMcm for each of tests M, N, O and 250 µMcm for test P), then said branching agent according to the invention is added in a (branching agent:neodymium salt) mass ratio of from 10 to 20.

In tests A, B, C, G, H, I, J, K, L, M, N, P, the branching agent is used in a concentration of 0.2 mol/l in cyclohexane and, for tests D, E, F and O, of 0.1 mol/l in methylcyclohexane (tests D and E) or in cyclohexane (tests F, O).

Acetylacetone (hereafter "acac") is used as a shortstopping agent and the N-1,3-dimethylbutyl-N'-phenyl-p-phenylenediamine (abbreviated to 6PPD) is used as a protection agent ("acac:Nd" designating the(acetylacetone:neodymium) mass ratio).

The resultant polymer solution is then steam-stripped for 30 minutes in the presence of calcium tamolate. Finally, drying is performed in an oven at 60° C. in a vacuum (200 mm Hg) under a gentle stream of nitrogen for approx. 48 hours.

In Table 2 below, "cat. syst." denotes the catalytic system used, "conv. degree" the degree of conversion for the polymerization reaction, "S:P" the solvent:polymer mass ratio and "Sn:Nd" or "Ti:Nd" the (tin:neodymium) or (titanium:neodymium) mass ratio.

The microstructure of these polyisoprenes was determined using the MIR (mid-infrared) method, as specified in the attached appendix 4. This method made it possible to determine the content of cis-1,4 and 3,4 linkages to within an uncertainty of 0.1%.

It will be noted that the MIR method is very precise for the determination of the content of 3,4 structural units, since it uses polyisoprene samples having previously been calibrated for $^{13}$C NMR analysis.

Table 3 below compares the macrostructural and microstructural characteristics:

of said synthetic branched polyisoprenes IR A to IR P according to the invention,

TABLE 2

| | | | Polymerization conditions | | | | | Conditions for "branching" reaction | | | | |
|---|---|---|---|---|---|---|---|---|---|---|---|---|
| Tests | Branching agent | Cat. syst. | Duration | T (° C.) | S:M | Quantity of Nd (µMcm) | Conv. degree (%) | Duration (min) | T (° C.) | S:P | Sn:Nd or Ti:Nd | acac:Nd |
| A | SnCl$_4$ | 4 | 90 min | 25 | 9 | 1100 | 100 | 20 | 50 | 18 | 4.5 | 89 |
| B | SnCl$_4$ | 2 | 60 min | 50 | 9 | 700 | 100 | 20 | 50 | 9 | 14 | 139 |
| C | SnCl$_4$ | 4 | 90 min | 25 | 9 | 1100 | 100 | 20 | 50 | 18 | 4.5 | 89 |
| D | SnCl$_4$ | 5 | 16 h | −10 | 9 | 1750 | 100 | 20 | 50 | 18 | 2.6 | 56 |
| E | SnCl$_4$ | 5 | 16 h | −10 | 9 | 1700 | 100 | 15 | 50 | 18 | 2.7 | 57 |
| F | TiCl$_4$ | 6 | 90 min | 25 | 9 | 1000 | 100 | 25 | 60 | 18 | 7.0 | 98 |
| G | SnCl$_4$ | 4 | 90 min | 25 | 9 | 1100 | 100 | 20 | 50 | 18 | 4.5 | 89 |
| H | SnCl$_4$ | 2 | 16 h | 0 | 9 | 700 | 100 | 20 | 50 | 17.2 | 14 | 140 |
| I | SnCl$_4$ | 3 | 110 min | 50 | 17.8 | 739 | 100 | 75 | 50 | 18.2 | 6 | 60 |
| J | SnCl$_4$ | 3 | 110 min | 50 | 15 | 749 | 100 | 105 | 50 | 15.3 | 6 | 60 |
| K | TiCl$_4$ | 3 | 120 min | 50 | 17.8 | 739 | 100 | 135 | 50 | 18 | 6 | 60 |
| L | SnCl$_4$ | 3 | 75 min | 50 | 17.9 | 1049 | 100 | 36 | 50 | 18.3 | 6 | 56 |
| M* | SnCl$_4$ | 3 | 150 min | 50 | 9 | 300 | 100 | 60 | 70 | 18 | 10 | 25 |
| N* | SnCl$_4$ | 3 | 150 min | 50 | 9 | 300 | 100 | 60 | 70 | 18 | 15 | 25 |
| O* | SnCl$_4$ | 3 | 150 min | 50 | 9 | 300 | 100 | 60 | 70 | 18 | 15 | 25 |
| P* | SnCl$_4$ | 3 | 150 min | 50 | 9 | 250 | 100 | 60 | 70 | 18 | 20 | 25 |
| Q | none | 1 | 60 min | 50 | 9 | 340 | 100 | | n/a | | | 60 |
| R | none | 7 | 18 h | 50 | 7 | 100 | 90 | | n/a | | | 0 |
| S | none | 7 | 130 min | 50 | 9 | 125 | 91 | | n/a | | | 0 |

In relation to each of tests I and J, the concentration of TiCl$_4$ or SnCl$_4$ in the polymerization medium was 0.0935 mol/l.

In relation to tests K and L, this concentration of TiCl$_4$ or SnCl$_4$ was respectively 0.17 mol/l and 0.12 mol/l.

2) Results Obtained:

The macrostructure of each polyisoprene according to the invention is characterised by the inherent viscosity $\eta_{inh}$ at 0.1 g/dl in toluene (measured according to the attached appendix 3), the Mooney viscosity ML(1+4) at 100° C. (measured in accordance with Standard ASTM D-1646), the distribution of molecular masses by the SEC method (measured according the attached appendix 5) and the gel or insoluble solids content by the mesh method (measured according to the attached appendix 6).

of said linear synthetic polyisoprenes IR Q to IR S not in accordance with the invention (obtained by means of a catalytic system of the invention but without branching agent), and of commercially available linear synthetic polyisoprenes IR 1 to IR 6:

IR 1: sold by Nizhnekamsk under the name "SKI3S" or "IR 6596",

IR 2: sold by Nippon Zeon under the name "IR 2200L",

IR 3: sold by Japan Synthetic Rubber under the name "JSR 2200",

IR 4: sold by Goodyear under the name "NATSYN 2200",

IR 5: sold by Nizhnekamsk under the name "SKI3S" or "IR 6596",

IR 6: sold by Nippon Zeon under the name "IR 2200".

TABLE 3

| IR | Inherent viscosity (dl/g) | Flow (100) | ML (1 + 4) at 100° C. | 3,4 units (%) | trans-1,4 units (%) | cis-1,4 units (%) | Gel by mesh method (%) | Mw (g/mol/10$^3$)/ Ip |
|---|---|---|---|---|---|---|---|---|
| IR A | 3.06 | 57 | 84 | 1.2 | 0.1 | 98.7 | <0.3 | 280/2.50 |
| IR B | 2.97 | 99 | 79 | 1.7 | 0.2 | 98.1 | <0.3 | 725/3.20 |

TABLE 3-continued

| IR | Inherent viscosity (dl/g) | Flow (100) | ML (1 + 4) at 100° C. | 3,4 units (%) | trans-1,4 units (%) | cis-1,4 units (%) | Gel by mesh method (%) | Mw (g/mol/10³)/ Ip |
|---|---|---|---|---|---|---|---|---|
| IR C | 2.80 | 95 | 69 | 1.2 | 0.1 | 98.7 | <0.3 | 760/3.20 |
| IR D | 2.89 | 29 | 94 | 0.6 | 0.0 | 99.4 | <0.3 | 788/3.30 |
| IR E | 3.00 | 36 | 80 | 0.6 | 0.0 | 99.4 | <0.3 | 818/3.70 |
| IR F | 2.87 | 70 | 85 | 1.2 | 0.1 | 98.7 | <0.3 | 626/3.56 |
| IR G | 3.03 | 58 | 79 | 1.2 | 0.1 | 98.7 | <0.3 | 672/2.80 |
| IR H | 4.20 | 40 | 104 | 1.0 | 0.0 | 99.0 | <0.3 | 1191/2.70 |
| IR I | 3.31 | 65 | 91 | 1.8 | 0.1 | 98.1 | <0.3 | 920/3.00 |
| IR J | 3.27 | 40 | 91 | 1.8 | 0.2 | 98 | <0.3 | 921/2.95 |
| IR K | 3.99 | 34 | 107 | 1.8 | 0.2 | 98.1 | <0.3 | — |
| IR L | 2.95 | 44 | 86 | 1.8 | 0.1 | 98.1 | <0.3 | 812/3.09 |
| IR M | 4.00 | — | — | — | — | — | — | 1317/2.6 |
| IR N | 4.60 | — | — | — | — | — | — | 1428/3.2 |
| IR O | 4.70 | — | — | — | — | — | <0.3 | 1489/3.1 |
| IR P | 4.90 | — | — | — | — | — | — | 1460/2.6 |
| IR Q | 4.30 | 196 | 86 | 2.0 | 0.2 | 97.8 | <0.3 | 1112/2.0 |
| IR R | 5.31 | 110 | — | 1.9 | 0.2 | 97.9 | <0.3 | 1290/2.15 |
| IR S | 4.25 | 266 | 80 | 1.8 | 0.2 | 98 | <0.3 | 1264/1.95 |
| IR 1 | 5.3 | 76 | 75 | 0.5 | 0.9 | 98.6 | <0.3 | 1383/4.2 |
| IR 2 | 4.7 | 69 | 87 | 0.4 | 1.5 | 98.1 | <0.3 | 1350/3.3 |
| IR 3 | 4.3 | 98 | 77 | 0.2 | 1.4 | 98.4 | <0.3 | 1209/3.5 |
| IR 4 | 3.90 | 115 | 79 | 0.5 | 1.9 | 97.6 | <0.3 | 1044/3.6 |
| IR 5 | 5.3 | 76 | 75 | 0.5 | 0.9 | 98.6 |  | 1383/4.2 |
| IR 6 | 4.70 | 69 | 87 | 0.4 | 1.5 | 98.1 | <0.3 | 1350/3.3 |

First Series of Tensile Tests in "Uncured" State

Figure 4:
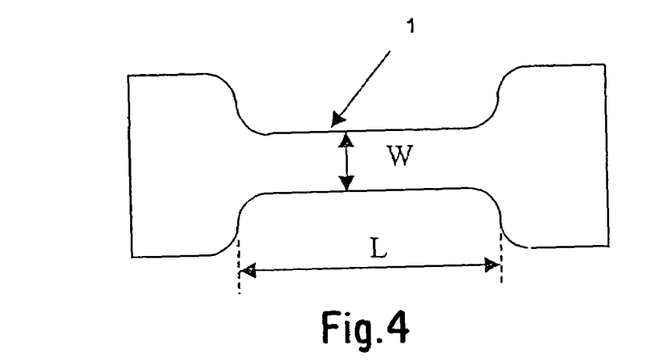
FIG. 4 is a schematic plan view of the geometry of the test specimen used for obtaining the stress-deformation curves of FIG. 1 and FIG. 2.
Figure 5:
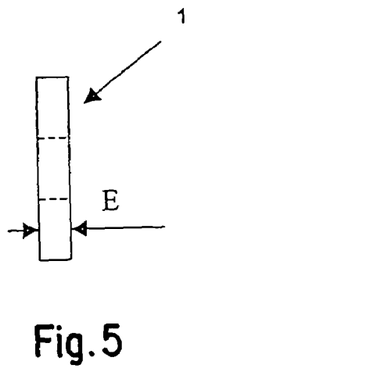
FIG. 5 is a schematic side view of the test specimen of FIG. 4 which in particular shows the thickness of said test specimen.

In accordance with the description in the attached appendix 1, paragraph I/, and with FIGS. 4 and 5, uncrosslinked test specimens 1 were prepared respectively consisting of:

three branched synthetic polyisoprenes IR A, IR D and IR E according to the invention, two linear synthetic polyisoprenes IR R and IR S not in accordance with the invention (but obtained by a catalytic system according to the invention), six commercially available synthetic polyisoprenes IR 1 to IR 6, and two natural rubbers NR1 and NR2 known by the nonproprietary name "TSR20".

Figure 1:
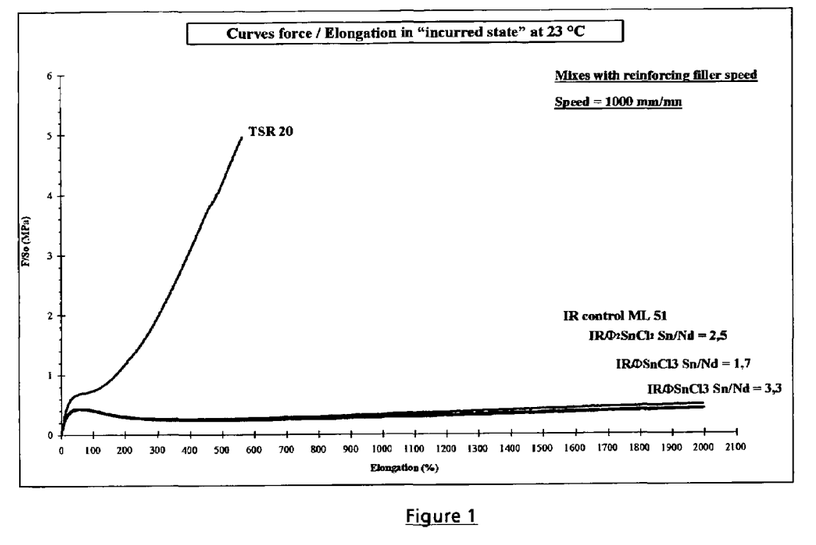
Figure 6:
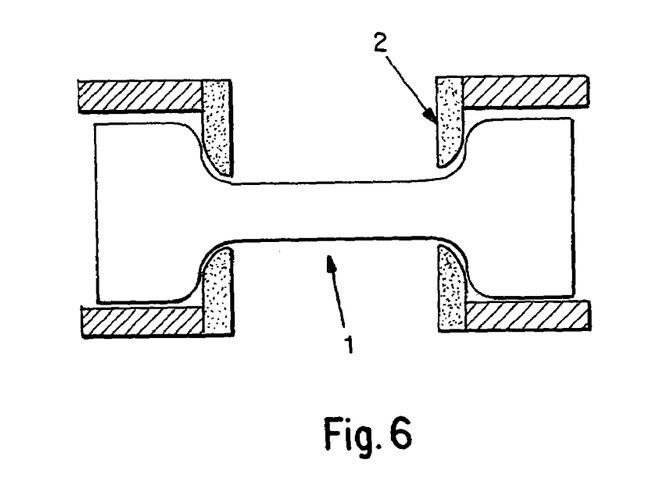
FIG. 6 illustrates a plan view of the application of the tensile tester to said test specimen.
Figure 7:
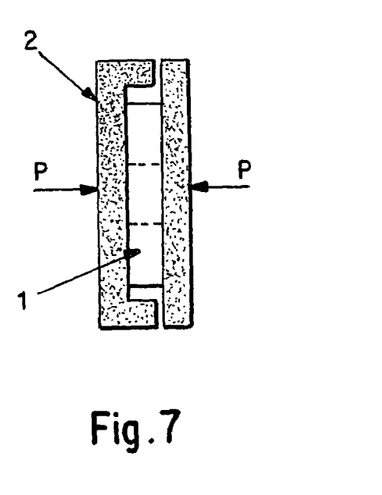
FIG. 7 also illustrates a side view of the application of said tensile tester to said test specimen.

Tensile tests in the "uncured" state were performed on these uncrosslinked test specimens 1. This appendix 1, paragraph I/, details the method and tensile tester used for these tests, in relation to FIGS. 6 and 7. FIG. 1 illustrates the results obtained in the form of curves of apparent stress $F/S_0$ (MPa) as a function of deformation (%).

This FIG. 1 shows that the branched polyisoprenes according to the invention IR A, IR D and IR E each exhibit, at a relative elongation α of 150% applied to the dumbbell-shaped test specimen consisting of the corresponding polyisoprene, an apparent stress $F/S_0$ which is, on the one hand, very much greater than that of "commercial" polyisoprenes IR 1 to IR 6 and to that of linear polyisoprenes IR R and IR S not in accordance with the invention, and which is, on the other hand, close to that of known natural rubbers NR1 and NR2.

It can be seen that these branched polyisoprenes according to the invention IR A, IR D and IR E have an apparent stress $F/S_0$ greater than 0.4 MPa for this relative elongation of 150%. It will be noted that the apparent stress $F/S_0$ of the polyisoprene IR E according to the invention is substantially equal to 0.5 MPa for this relative elongation, and that that of polyisoprene IR D according to the invention is greater than 0.6 MPa for this same relative elongation.

FIG. 1 shows that the force-elongation curve in the uncrosslinked state of these polyisoprenes according to the invention IR A, IR D and IR E is relatively close to the curves corresponding to known natural rubbers.

This "straightening out" in the uncrosslinked state of the force-elongation curve relative to the known polyisoprenes IR 1 to IR 6 and IR R, IR S reveals an increased ability, relative to these known synthetic polyisoprenes, of the polyisoprenes according to the invention to crystallise under tension.

Second Series of Tensile Tests in "Uncured" State

Uncrosslinked rubber compositions A to F were prepared, the elastomeric matrices of which respectively consist of said polyisoprenes IR A to IR F according to the invention, together with an uncrosslinked rubber composition referenced T incorporating solely natural rubber NR1 named "TSR20" as the elastomeric matrix, with the aim of performing tensile tests in the "uncured" state of test specimens 1 (shown schematically in FIGS. 4 and 5) which respectively consist of these compositions A to F and T. Reference will be made to the attached appendix 1, paragraph II/, for the detailed description of each rubber composition A to F and T, of each test specimen 1 and the tensile tests performed (see FIGS. 6 and 7).

Figure 2:
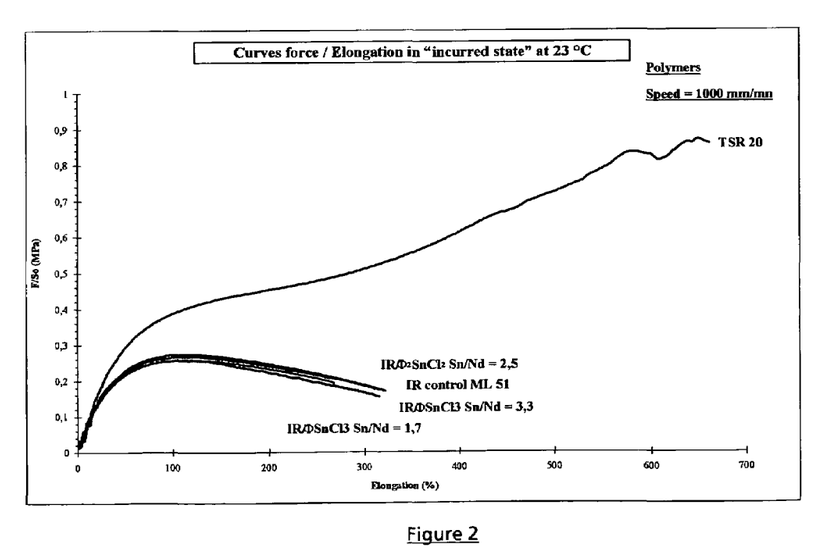

The results of the tensile tests are illustrated in FIG. 2, in the form of curves of apparent stress $F/S_0$ as a function of deformation (%).

Table 4 below presents the apparent stress $F/S_0$ results obtained for relative elongations of 400% and 300%.

TABLE 4

| Test specimens | $F/S_0$ (in MPa) at 400% | $F/S_0$ (in MPa) at 300% |
|---|---|---|
| T | 3.1 | 2.0 |
| A | 1.3 | 0.9 |
| B | 1.8 | 1.2 |

TABLE 4-continued

| Test specimens | F/S₀ (in MPa) at 400% | F/S₀ (in MPa) at 300% |
|---|---|---|
| C | 1.4 | 0.9 |
| D | 3.2 | 2.0 |
| E | 2.5 | 1.6 |
| F | 2.2 | 1.4 |

These results show that the synthetic polyisoprenes IR A to IR F according to the invention, when they constitute the elastomeric matrix of a filled and uncrosslinked rubber composition, impart to this composition, at a relative elongation of 400% of the test specimen 1, an apparent stress $F/S_0$ greater than 1.0 MPa, possibly even being greater than 1.5 MPa.

It will be noted that this apparent stress may even be greater than 2.0 MPa and even greater than 3.0 MPa, at this relative elongation of 400%.

These results show that the synthetic polyisoprenes IR A to IR F according to the invention, when they constitute the elastomeric matrix of a filled and uncrosslinked rubber composition, impart to this composition, at a relative elongation of 300% of the test specimen 1, an apparent stress $F/S_0$ greater than 0.7 MPa, possibly even being greater than 1.2 MPa.

It will be noted that this apparent stress may even be greater than 1.7 MPa at this relative elongation of 300%.

In the light of these results, it would also seem that these synthetic polyisoprenes according to the invention impart to this uncrosslinked composition an $F/S_0$—elongation curve very close to that which natural rubber imparts to an identical composition (with the exception of the elastomeric matrix).

This confirms that the synthetic polyisoprenes according to the invention exhibit an ability to crystallise under tension which is analogous to that of natural rubber.

Degree of Branching of the Polyisoprenes According to the Invention

With the aim of characterising the degree of branching of the samples of synthetic polyisoprenes IR B to IR P according to the invention, the variation in their loss angle cotangent (see appendices 2 and 3) as a function of their inherent viscosity was compared with the variation of this same cotangent in the case of samples of said "commercial" synthetic polyisoprenes IR 1 to IR 6 and of said linear polyisoprene IR Q which is not in accordance with the invention.

To this end, each of the samples was subjected to dynamic shear stress of 10% deformation and at a stress frequency of 0.035 Hz (see appendix 2 of the present description for the details relating to the stress conditions).

Figure 3:
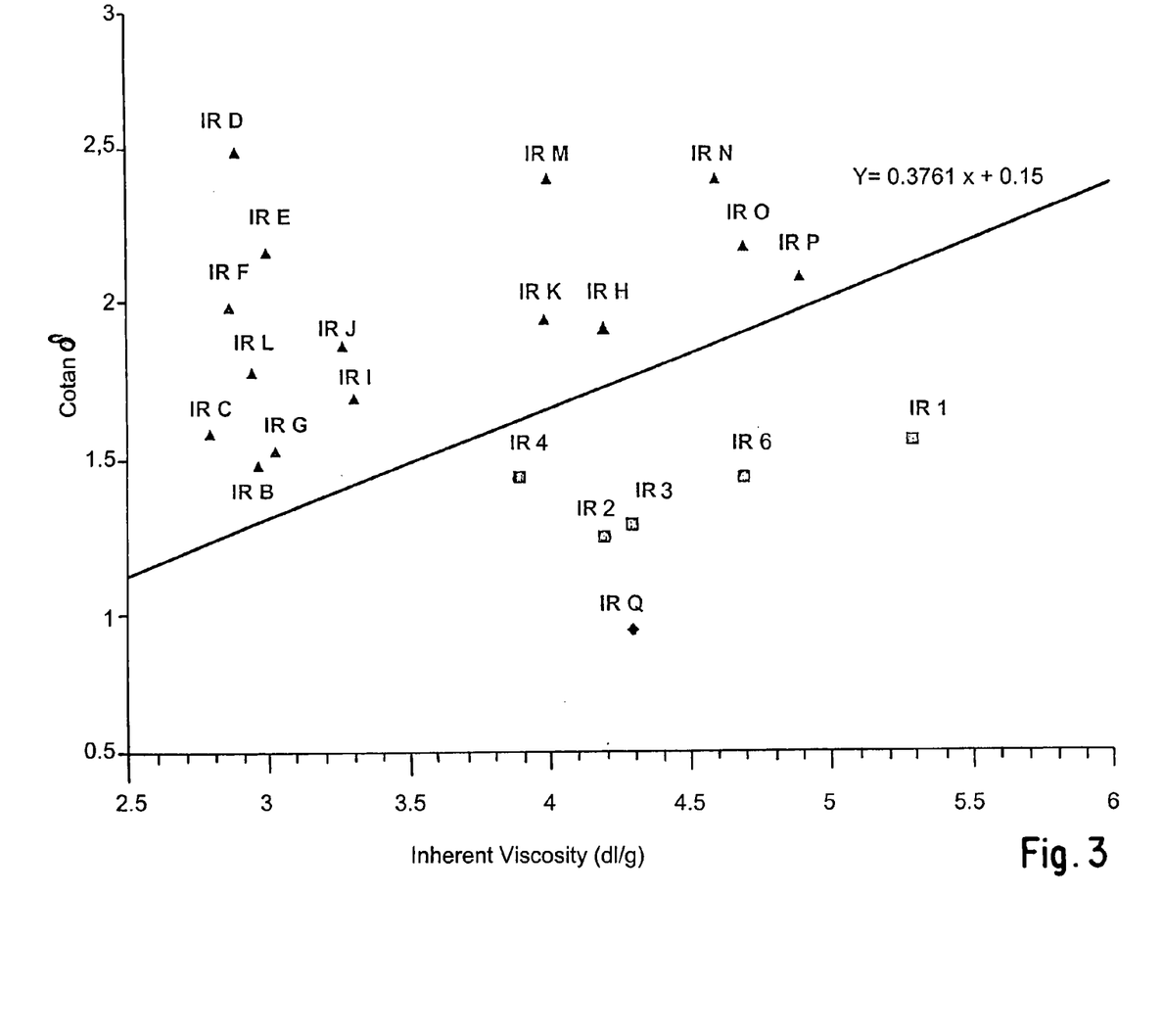

The measurements of loss angle cotangent as a function of inherent viscosity, carried out in accordance with appendices 2 and 3, are illustrated in FIG. 3. As can be seen from this FIG. 3, the synthetic polyisoprenes IR B to IR P according to the invention, at an inherent viscosity $\eta_{inh}$ which varies substantially from 2.5 dl/g to 5.5 dl/g, are characterised in that they have a value of cotan δ which is greater than or equal to 0.3761. $\eta_{inh}$+0.15.

In fact, it can be seen in FIG. 3 that the coordinate points (x=$\eta_{inh}$; y=cotan δ) which characterise these branched polyisoprenes IR B to IR P are all located distinctly above the curve of the equation y=0.3761 x+0.15, unlike the corresponding coordinate points which characterise the "commercial" synthetic polyisoprenes IR 1 to IR 6 and the linear polyisoprene IR Q.

It may be deduced from this that the synthetic polyisoprenes according to the invention, following the example of natural rubber, are appreciably more branched than known synthetic polyisoprenes.

It will be noted that these polyisoprenes according to the invention may have a large range of inherent viscosities, which may in particular be of the same order as those of the most viscous "commercial" synthetic polyisoprenes, i.e. approaching 5 dl/g.

Appendix 1

Obtaining Force-Elongation Curves from Uncrosslinked Test Specimens Based on Synthetic or Natural Polyisoprenes I/ First Series of Tests on Test Specimens Consisting of Known Synthetic Polyisoprenes, of Polyisoprenes According to the Invention or of Natural Rubbers 1) Forming Polyisoprene Plates in the Uncrosslinked State:

Each polyisoprene plate of thickness E of 2.5 mm is formed in a mould by pressure moulding between two polyester sheets for 10 minutes at 110° C.

Each plate formed in this manner is maintained under pressure while it cools for a period of 16 hours and, once these 16 hours have elapsed, it is removed from the mould.

2) Preparation of Test Specimens 1 from These Plates:

Each test specimen 1 is then immediately cut out in a dumbbell shape from one of the plates extracted from the mould, such that said test specimen comprises two ends joined to one another by a shank of thickness E=2.5 mm, length L=26 mm and width W=6 mm. Cutting out is performed in such a manner that the longitudinal direction L of the test specimen 1 is parallel to the calendering direction.

3) Conditioning of the Plates Obtained:

In order to avoid the formation of air bubbles in the polyisoprene plates or test specimens, the tensile tests are performed within a short period following extraction from the mould, said period being at most equal to 1 hour.

4) Tensile Tests:

At least three identical test specimens 1 are tested under the same conditions for each of the tensile tests performed.

Each tensile test involves subjecting each test specimen 1 to tension at a constant speed and recording the variation in the tensile force as the function of the displacement of the mobile jaws of an "INSTRON 4501" tensile tester 2. This tester 2 is equipped with a force sensor and means for measuring the displacement of said mobile jaws.

Each test specimen 1 is held in its widest part under a clamping pressure P equal to 2 bar (see FIG. 5).

Each tensile test is performed at ambient temperature, in a laboratory air-conditioned to 23° C. and 50% humidity. The constant displacement speed of the mobile jaws is 1000 mm/minute. The variations in tensile force and displacement of the mobile jaws are recording during each test.

The following parameters are calculated for each test specimen 1:

Relative deformation α(%)=100×D/L (D is the displacement of the mobile jaws in mm), measured by the tester's sensor during each test and L=26 mm is the initial length of the test specimen 1 set by the "punch"), and Apparent stress F/S$_0$ (MPa), which represents the ratio of the force (in N) measured by the tester's sensor, over the initial cross-section S$_0$ of the test specimen (S$_0$=W. E in mm$^2$, W=6 mm being the width set by the "punch" and E=2.5 mm the thickness of the test specimen 1 before application of tension).

For each level of relative deformation, the mean of the corresponding stresses was calculated for three identical test specimens 1, and in this way, a stress (mean of three measurements)—deformation graph was plotted for each of the test specimens tested.

II/ Second Series of Tests on Test Specimens Consisting of Compositions Based on Synthetic Polyisoprenes According to the Invention or on Natural Rubber 1) Preparation of Plates Consisting of Uncrosslinked Rubber Compositions:

The rubber composition intended for making each plate contains, per 100 g of synthetic polyisoprene or natural rubber:

50 g of carbon black N375
5 g of ZnO
2 g of stearic acid
1 g of "Santoflex 13" antioxidant
1.2 g of soluble sulphur "2H"
1.2 g of CBS (N-cyclohexyl-benzothiazyl-sulphenamide).

These ingredients are mixed in a "Brabender" internal mixer, the effective volume of which is 87 cm$^3$, under the following conditions:

Tank temperature=60° C.
Rotational speed of paddles=50 rpm
Filling coefficient=65%
The ingredients are introduced in the following order:
0 minute: polyisoprene
1 minute: carbon black, ZnO, stearic acid, antioxidant
5 minutes: sulphur and CBS
6 minutes: dropping (performed before 6 minutes if the temperature reaches 105° C.).

The mixture is then homogenised on a calender with cylinders at 75° C. so as to obtain a sheet of a thickness of 2.9 mm.

This sheet is pressure moulded in a mould for 10 minutes at 110° C. between two polyester sheets, then extracted from the mould and finally cooled in the open air. A plate of a thickness of 2.5 mm is thus obtained.

2) Conditioning of the Plates Obtained:
Between being prepared and subjected to tensile testing, each plate is stored in an ambient atmosphere for a period of at least 5 hours and at most 8 days.

3) Preparation of Test Specimens 1 from these Plates:
The method stated in paragraph I/2) above is used.

4) Tensile Tests:
The method stated in paragraph I/4) above is used.

Appendix 2

Dynamic Shear Properties of the Polyisoprenes Obtained

1) Apparatus Used:
The apparatus used is sold by Alpha Technologies under the name "RPA2000" ("Rubber Process Analyser"). It allows measurement of the dynamic properties of elastomers and the rubber compositions containing them.

2) Sample Preparation:
The mass of the polyisoprene sample is 4.5±0.5 grams. The platens of the "RPA2000" (see below) are protected with interleaving films obtained from a roll of "Nylon® Dartek f0143" which are placed between these platens and the sample.

3) Description of the Test:
The sample is preheated for three minutes to 130° C. in the thermally stabilised "RPA" chamber, before carrying out 10 dynamic stress cycles at 0.035 hertz, 10% deformation at 130° C. The results are calculated as a mean of the last five cycles.

Appendix 3

Determination of the Inherent Viscosity of the Polyisoprenes Obtained

Principle:
Inherent viscosity is determined by measuring the polyisoprene solution drain time t and the toluene drain time t$_0$ in a capillary tube.

The method is broken down into 3 major steps:
step no. 1: preparation of the 0.1 g/dl measurement solution in toluene;
step no. 2: measurement of polyisoprene drain time t and toluene drain time t$_0$ at 25° C. in an "Ubbelohde" tube;
step no. 3: calculation of inherent viscosity.

Step No. 1—Preparation of the Measurement Solution from Dry Polyisoprene:

0.1 g of dry polyisoprene (using a precision balance, scale e=0.1 mg) and 100 ml of 99.5% high purity toluene are introduced into a 250 ml bottle which has been washed and oven-dried at 140° C. for at least 10 hours.

The bottle is placed on a vibratory shaker for 90 minutes (check whether the polyisoprene has not passed into solution).

Step No. 2—Measurement of Toluene Drain Time t$_0$ and Polyisoprene Solution Drain Time t at 25° C.:

1. Equipment:
1 tank with a bath thermostatically-controlled to 25° C.±0.1° C. provided with a mains water cooling system. The tank is filled ¼ with mains water and ¾ with demineralised water.

1 "PROLABO" alcohol thermometer with an uncertainty of ±0.1° C. placed in the thermostatically-controlled bath 1 "Ubbelohde" viscosimetric tube intended to be placed in a vertical position in the thermostatically-controlled bath.

Characteristics of the Tubes Used:
diameter of capillary: 0.46 mm;
capacity: 18 to 22 ml.

2. Measurement of Toluene Drain Time t$_0$:
rinse the tube out by washing with toluene;
introduce the quantity of toluene (purity greater than 99.5%) required for the measurement;
check that the thermostatically-controlled bath is at 25° C.;
determine the drain time t$_0$.

3. Measurement of the Polyisoprene Solution Drain Time t
rinse the tube out by washing with the polyisoprene solution;
introduce the quantity of polyisoprene solution required for the measurement;
check that the thermostatically-controlled bath is at 25° C.
determine the drain time t.

Step No. 3—Calculation of Inherent Viscosity:
Inherent viscosity is obtained by the following relationship:

$$\eta_{inh} = \frac{1}{C} \ln\left[\frac{(t)}{(t_o)}\right]$$

where
C: concentration of the solution of polyisoprene in toluene in g/dl;
t: drain time of the solution of polyisoprene in toluene in hundredths of a minute;
$t_o$: drain time of the toluene in hundredths of a minute;
$\eta_{inh}$: inherent viscosity stated in dl/g.

Appendix 4

Determination of the Microstructure of the Polyisoprenes Obtained

1) Sample Preparation by $^{13}$C NMR Method:
2 g of polyisoprene are extracted in refluxing acetone for 8 hours. The extracted polyisoprene is then dried at ambient temperature under a vacuum for 24 hours. This dried polyisoprene is then redissolved in chloroform. The polyisoprene solution is filtered and the solvent removed in a rotary evaporator for 4 hours (bath temperature is 40° C.).

2) Mid-Infrared (MIR) Analysis Method:
a) Sample Preparation:
This MIR method is calibrated by means of samples as prepared in paragraph 1) above. As for the samples to be analysed by this MIR method, an exactly 10 g/l solution of polyisoprene in $CCl_4$ used, which is analysed with a KBr cell with a pathlength of 0.2 mm.

b) Apparatus:
Spectrophotometer sold under the name "VECTOR 22".
Recording conditions:
beam opening: maximum;
resolution: 2 $cm^{-1}$;
frequency of moving mirror: 10 kHz;
detector: DTGS;
accumulations: 64 scans;
purge time: 3 min;
spectral window: 4000 to 400 $cm^{-1}$;
transmission spectra recorded;
Spectrum processing:
transfer to microcomputer;
processing with "OPUS" software from "BRUKER".

a) Assignment of Spectrum Peaks:
Spectral studies and the contents of the following documents made it possible to determine the characteristic bands of the various linkage modes:
Y. Tanaka, Y. Takeuchi, M. Kobayashi, H. Tadokoro, *Journal of Polymer Science*, Part A-2, 1971, 9(1), 43-57.
J. P. Kistel, G. Friedman, B. Kaempf, *Bulletin de la Société Chimique de France*, 1967, no. 12.
F. Asssioma, J. Marchal, *C. R. Acad. Sc. Paris*, Ser C, 1968, 266(22), 1563-6 and Ser D, 1968, 266(6), 369-72.
T. F. Banigan, A. J. Verbiscar, T. A. Oda, *Rubber Chemistry and technology*, 1982, 55(2), 407-15.

The 3,4 conformation exhibits two characteristic bands:
a high intensity band at 880 $cm^{-1}$ corresponding to the out-of-plane deformation vibrations ($\delta$ C—H) of the terminal hydrogens of the vinyl group (=$CH_2$).
a band at 3070 $cm^{-1}$ corresponding to the $\nu$ C—H stretching of this same group (=$CH_2$).
The cis-1,4 conformation has a characteristic band around 3030 $cm^{-1}$. This band corresponds to the $\nu$ C—H stretching vibrations of the =CH group.
The band corresponding to the symmetrical deformation vibrations of the methyl groups ($\delta$ $CH_3$) is a complex band incorporating all three conformations. Absorption corresponding to the $\delta$ $CH_3$ of the trans-1,4 conformation is at its maximum around 1385 $cm^{-1}$; this is a shoulder of the band.

d) Integration Method:
The 3,4 and cis-1,4 bands are integrated by the tangential area method.
The trans-1,4 absorption maximum is located on the shoulder of the intense $\delta$ $CH_3$ band. The most suitable method in this case is to measure the height of the band using the tangent of the $\delta$ $CH_3$ band as the baseline.

e) Calibration Curves:
Statement of Beer-Lambert law:
$Do(\nu$ or $\delta) = \epsilon(\nu$ or $\delta)$ e c where:
$Do(\nu$ or $\delta)$=optical density of the band $\nu$ or $\delta$;
$\epsilon(\nu$ or $\delta)$=molar extinction coefficient of the analyte responsible for the $\nu$ or $\delta$ band;
c=molar concentration of the analyte; and
e=sample thickness.
Commercial polyisoprenes (sold as "IR305", "NATSYN 2200" and "SKI-3S"), a polyisoprene synthesised in the laboratory (MC78) and natural rubber (NR) are used as standards. Compared at isoconcentration (solutions), the law may thus be written:
Dx=KX where:
Dx=integration value of the band corresponding to structural unit X,
X=content of structural unit X in the rubber (determined by $^{13}$C NMR), and
K=calibration constant.
Calibration curves Dx=f(X) may thus be plotted for each of the structural units.

Appendix 5

Determination of the Distribution of Molecular Weights of the Elastomers Obtained by Size Exclusion Chromatography (SEC)

a) Measurement Principle:
SEC (size exclusion chromatography) makes it possible physically to separate macromolecules by their size in the swollen state in columns filled with a porous stationary phase. The macromolecules are separated by their hydrodynamic volume, the bulkiest being eluted first.
Although not an absolute method, SEC does enable an assessment to be made of the molecular weight distribution of a polymer. On the basis of commercially available standards, the various number-average (Mn) and weight-average (Mw) molecular weights may be determined and the polydispersity index calculated (Ip=Mw/Mn).

b) Preparation of the Polymer:
The polymer sample is not subjected to any particular treatment prior to analysis. It is simply solubilized in tetrahydrofuran to a concentration of approximately 1 g/l.

c) SEC Analysis:
The apparatus used is a "WATERS ALLIANCE" chromatograph. The elution solvent is tetrahydrofuran, the flow rate 0.7 ml/min, the temperature of the system 35° C. and the duration of analysis 90 min. A set of four columns with the trade names "STYRAGEL HMW6E", "STYRAGEL HMW7" and two "STYRAGEL HT6E", arranged in this order, is used.

The volume of polymer sample solution injected is 100 µl. The detector is a "WATERS 2140" differential refractometer and the chromatographic data processing software is the "WATERS MILLENNIUM" system.

Appendix 6

Determination of insoluble solids content of the polyisoprenes by the mesh method.

1) Scope:

Using this mesh method, it is possible to determine the insoluble solids content of the polymers for values greater than 0.3%. The method is applicable to any polymers with an inherent viscosity (in toluene at 25° C. and at 0.1 g/dl) which is below 5.5 dl/g.

Unless indicated otherwise, the measurement is made in toluene.

2) Principle:

A known quantity of polymer is stirred at ambient temperature in toluene under specific conditions and the insoluble solids are filtered out onto a metal filter, dried and then weighed.

3) Equipment:
Vibratory shaker
Cap crimper
Rubber seals and caps
500 ml Steinie bottle
Vacuum oven for drying, set to 100° C.
Desiccator
Stainless steel fabric filter (10 cm×10 cm). Mesh size: 125 µm
Balance accurate to 0.1 mg
Pair of scissors
Aluminium boats.

4) Reagent:
Toluene suitable for polymerization.

5) Procedure:

Weigh out, to an accuracy of 0.1 mg, 1.0 g (P) of polymer cut into small pieces into a previously tared aluminum boat. Introduce the polymer into a 500 ml Steinie bottle containing 200 ml of toluene. Cap the bottle. Place it horizontally on the vibratory shaker and shake for at least 6 hours at a speed of 100 to 120 to-and-from movements per minute. Immediately filter through a metal filter which has previously been washed with toluene, dried in an oven for 1 hour, cooled, kept in a Desiccator and tared to an accuracy of 0.1 mg (P1) immediately on removal from the desiccator. Rinse the bottle twice with 50 ml of toluene and pour the toluene rinsings onto the filter.

Dry the metal filter for 1 hour in the vacuum oven at 100° C. Leave to cool for 30 minutes in the desiccator and weigh to an accuracy of 0.1 mg (P2).

6) Calculation:
Where:
P is the weight in grams of the polymer analysed
P1 is the weight in grams of the metal filter before filtration
P2 is the weight in grams of the metal filter after filtration The insoluble solids content T, stated in %, is given by the formula:

$$T = 100\ (P2-P1)/P\ (\%)$$

Round the result to the closest multiple of 0.1.

N.B.:

Under certain circumstances, the polymer may remain stuck to the walls of the Steinie bottle, in which case it must be removed with a spatula and placed on the metal filter.

The invention claimed is:

1. A crosslinkable branched synthetic polyisoprene, having an apparent stress $F/S_0$ greater than or equal to 0.4 MPa at a relative elongation α of 150%, applied to a dumbbell-shaped test specimen (1) which consists of said crosslinkable polyisoprene and is obtained by:

forming a plate of thickness E=2.5 mm consisting of said polyisoprene by pressure molding for 10 minutes at 110° C. in a mold between two polyester sheets, cooling the plate formed in said manner under pressure for a period of 16 hours, extracting the plate formed and cooled in said manner from said mold on completion of said period, cutting out said test specimen (1) from the plate extracted in said manner such that said test specimen (1) comprises two ends joined to one another by a shank of thickness E=2.5 mm, length L=26 mm and width W=6 mm, said test specimen (1) then being subjected, at the latest 1 hour after said extraction, to tension at a temperature of 23° C. and an atmospheric humidity of 50% by displacement at the constant speed of 100 mm/min of the mobile jaws of a tensile tester (2) relative to the fixed jaws of said tester, said jaws respectively holding said ends with an identical clamping pressure of 2 bar, where:

α (%)=100×D/L (D being the measured displacement of said mobile jaws in mm), and $F/S_0$ (MPa)=tensile force F/initial cross-section $S_0$ (width×thickness in mm²) of the test specimen(1).

2. The synthetic branched polyisoprene according to claim 1, wherein the apparent stress $F/S_0$ is greater than or equal to 0.5 MPa for said relative elongation α of 150%.

3. The synthetic branched polyisoprene according to claim 2, wherein the apparent stress $F/S_0$ is greater than or equal to 0.6 MPa for said relative elongation α of 150%.

4. The synthetic branched polyisoprene according to claim 1, which satisfies the relationship (I): Cotan $\delta \geq 0.3761 \cdot \eta_{inh} + 0.15$, where cotan δ is the cotangent of the loss angle of a sample of said polyisoprene, measured at 130° C., said sample being subjected to shear stress to 10% deformation and at a stress frequency of 0.035 Hz, and where $\eta_{inh}$ is the inherent viscosity of said polyisoprene, measured in toluene at 25° C. and at a concentration of said polyisoprene in toluene of 0.1 g/dl.

5. The synthetic branched polyisoprene according to claim 4, which further satisfies the relationship (ii): Cotan $\delta \geq 0.3761 \cdot \eta_{inh} + 0.60$.

6. The synthetic branched polyisoprene according to claim 5, which further satisfies the relationship (iii): Cotan $\delta \geq 0.3761 \cdot \eta_{inh} + 1.0$.

7. The synthetic branched polyisoprene according to claim 1, having an inherent viscosity $\eta_{inh}$, measured at 0.1 g/dl in toluene according to the attached appendix 3, which is greater than or equal to 4 dl/g.

8. The synthetic branched polyisoprene according to claim 1, having an a cis-1,4 linkage content, measured according to the mid-infrared analysis method, which is greater than or equal to 98.0%.

9. The synthetic branched polyisoprene according to claim 8, wherein said cis-1,4 linkage content is strictly greater than 99.0%.

10. The synthetic branched polyisoprene according to claim 9, wherein said cis-1,4 linkage content is greater than or equal to 99.3%.

11. A synthesis process for a branched polyisoprene according to claim 1, comprising the reaction of a catalytic system in the presence of isoprene to polymerise said isoprene, wherein said process comprises the polymerization of isoprene in an inert hydrocarbon polymerization solvent or without solvent, said catalytic system being based on at least:

a conjugated diene monomer, an organic phosphoric acid salt of one or more rare earth metals, said salt being in suspension in at least one inert, saturated and aliphatic or alicyclic hydrocarbon solvent which is included in said catalytic system, an alkylating agent consisting of an alkylaluminum of the formula $AlR_3$ or $HAlR_2$, H being hydrogen and R being an alkyl group, and an alkylating agent/rare earth salt molar ratio of from 1 to 7 a halogen donor consisting of an alkylaluminum halide, and in that said process further comprises, following said polymerization, a cationic reaction between said catalytic system and at least one branching agent selected from the group consisting of halogenated organometallic compounds, halogenated metal compounds of formula $MX_m$, M being a metal of group IV or V, X being a halogen represented by fluorine, chlorine, bromine or iodine and m being a natural integer equal to 3 or 4, and halogenated organometallic compounds of formula $R_nM'X_{4-n}$, R being an aliphatic, alicyclic or aromatic hydrocarbon group, M' being a metal of group IV or V, X being a halogen represented by fluorine, chlorine, bromine or iodine and n being a natural integer of from 1 to 3.

12. The synthesis process for a branched polyisoprene according to claim 11, wherein said process comprises, following said polymerization and prior to the addition of said branching agent, the addition of a supplementary quantity of said catalytic system.

13. The synthesis process according to claim 11, wherein said branching agent is titanium tetrachloride.

14. The synthesis process according to claim 11, wherein said branching agent is tin tetrachloride.

15. The synthesis process according to claim 11, wherein said isoprene polymerization reaction occurs at a temperature below 0° C., such that said polyisoprene has a cis-1,4 content, measured according to the mid-infrared analysis method, which is strictly greater than 99.0%.

16. The synthesis process according to claim 15, wherein said isoprene polymerization reaction occurs at a temperature less than or equal to −10° C., such that said polyisoprene has a cis-1,4 content, measured according to the mid-infrared analysis method, which is greater than or equal to 99.3%.

17. The synthesis process according to claim 11, wherein said salt is a rare earth tris [bis(2-ethylhexyl)phosphate].

18. The synthesis process according to claim 17, wherein said salt is neodymium tris[bis(2-ethylhexyl)phosphate].

19. The synthesis process according to claim 11, wherein said catalytic system comprises said rare earth metal or metals in a concentration of from 0.01 mol/l to 0.06 mol/l.

20. The synthesis process according to claim 11, wherein, in said catalytic system, the halogen donor/salt molar ratio has a value of from 2.0 to 3.5.

21. The synthesis process according to claim 11, wherein, in said catalytic system, the conjugated diene monomer/salt molar ratio has a value of from 15 to 70.

22. The synthesis process according to claim 11, wherein said conjugated diene monomer is butadiene.

23. The synthesis process according to claim 11, wherein said alkylating agent is diisobutylaluminum hydride.

24. The synthesis process according to claim 11, wherein said halogen donor is diethylaluminum chloride.

* * * * *